(12) United States Patent
Sato

(10) Patent No.: US 6,778,591 B2
(45) Date of Patent: Aug. 17, 2004

(54) PATH SEARCH CIRCUIT DIVIDING A RECEIVED SIGNAL INTO A PLURALITY OF FFT WINDOWS TO REDUCE ARITHMETIC OPERATION PROCESSES FOR CROSS-CORRELATION COEFFICIENTS

(75) Inventor: Toshifumi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 660 days.

(21) Appl. No.: 09/840,287

(22) Filed: Apr. 23, 2001

(65) Prior Publication Data

US 2001/0036221 A1 Nov. 1, 2001

(30) Foreign Application Priority Data

Apr. 27, 2000 (JP) ........................................ 2000-128191

(51) Int. Cl.[7] .............................................. H04K 1/00
(52) U.S. Cl. ...................................... 375/147; 375/140
(58) Field of Search ................................ 375/130, 140, 375/141, 142, 147, 150, 343; 370/352; 455/561

(56) References Cited

U.S. PATENT DOCUMENTS

2001/0050950 A1 * 12/2001 Sato ........................... 375/150

FOREIGN PATENT DOCUMENTS

| EP | 001069708 A2 * | 1/2001 |
|----|----------------|---------|
| JP | 9-284191 | 10/1997 |
| JP | 9-312592 | 12/1997 |
| JP | 10-032523 | 2/1998 |
| JP | 10-173630 | 6/1998 |
| JP | 10-190522 | 7/1998 |

* cited by examiner

Primary Examiner—Temesghen Ghebretinsae
(74) Attorney, Agent, or Firm—Dickstein, Shapiro, Morin & Oshinsky, LLP.

(57) ABSTRACT

A path search circuit wherein a received signal is divided with a plurality of FFT windows to reduce arithmetic operation processing for cross-correlation coefficients is disclosed. An interleave unit divides received signal rxd into two rxd1, rxd2 at one-chip intervals, and the two sequences are picked out with overlapped FFT windows and FFT is performed for the picked out sequences by two FFT units. A cross power spectrum calculating unit determines cross power spectra between the received signal after the FFT and a reference signal stored in a reference signal storage unit. An output of the cross power spectrum calculating unit is averaged for each FFT window by an averaging unit, and IFFT is performed for the averaged cross power spectra by an IFFT unit. The two resulting cross-correlation coefficients are rearranged in order of time by a deinterleave unit and interpolated to an accuracy necessary for detection of a path timing by an interpolation unit.

7 Claims, 9 Drawing Sheets

PATH SEARCH CIRCUIT DIVIDING A RECEIVED SIGNAL INTO A PLURALITY OF FFT WINDOWS TO REDUCE ARITHMETIC OPERATION PROCESSES FOR CROSS-CORRELATION COEFFICIENTS

BACKGROUND OF THE INVENTION

1. Field of the Invention

This invention relates to a mobile telephone or portable telephone system (cellular system) which uses a direct sequence code division multiple access (DS-CDMA) communication method, and more particularly to a path search circuit for a base station radio apparatus.

2. Description of the Relates Art

Mobile communications systems in which a CDMA communication method is used have been developed in recent years and include systems which are based on the IS-95 standards (TIA/EIA) and have been put into practical use already and W-CDMA (Wideband Code Division Multiple Access) systems which are third generation mobile communications systems whose standardization is being proceeded in the 3 GPP (3rd Generation Partnership Project) although they have not been put into practical use as yet.

In a system based on the IS-95 standards, a spread code obtained by multiplying a PN code having a comparatively long period of 26.6 ms (80 ms/3, 32768 chips) and a Walsh code of a code length of 64 is used as a spread code for a downlink which is a link from a base station to a mobile station. As the PN code, different codes (accurately, codes shifted by predetermined number of times from the same spread code) are used by different base stations and, even in the same base station, for different sector antennae. The Walsh code of the code length of 64 is used to distinguish a plurality of channels transmitted from one sector antenna (for the CDMA, the same carrier is shared by a plurality of channels and the channels are distinguished with the spread code). A pilot channel which is not modulated with data is transmitted with a comparatively high power for each sector. For the Walsh code used in the pilot channel, the 0th code, i.e., a code of all "0"s, is used. In other words, a signal transmitted by the pilot channel is a predetermined code sequence having a period of 26.6 ms. Accordingly, a mobile station of a system which is based on the IS-95 standards uses the pilot channel to detect a peak of a cross-correlation between a predetermined code sequence of the pilot channel and a received signal to detect a path timing. The period of the spread code is 32,768 chips and is too long to determine cross-correlation coefficients at a time. Therefore, a sliding correlator is used to successively determine correlation coefficients while the received signal and a reference signal (the predetermined spread code of the pilot channel) are successively shifted in time.

A conventional reception timing detection method (chip synchronization) is disclosed in the following reference document 1, for example:

Reference document 1: Andrew J. Viterbi, "Principle of Spread Spectrum Communication", April 1995, Chapter 3, pp. 39–66, FIGS. 3.1, 3.2 and 3.6

According to the reception timing detection method disclosed in the reference document 1, acquisition of a timing of a signal spread with a spread code, which is a pseudo random code, is performed in two stages. In particular, the acquisition is divided into two stages of initial synchronization acquisition (search) and synchronization tracking (tracking). An initial synchronization acquisition (search) method is a method of serially searching for a timing while the reception timing is successively displaced by a ½ chip interval until the correlation power exceeds a certain threshold value as recited in Chapter 3, Paragraph 4 of the reference document 1. The synchronization tracking (tracking) is performed by a method called early-late gate or DLL (Delay Lock Loop). According to the methods, a correlation power at a timing earlier by $\Delta t$ of a delay time than a timing at which the signal is to be received and another correlation power at another timing later by $\Delta t$ are determined, and the timing is finely adjusted so that the difference between the correlation powers may be reduced to 0.

After a path timing is detected once, it is only required that a variation of the path timing can synchronously follow up (tracking) the variation of the propagation time between a base station and a mobile station which is caused by a movement of the mobile station and the variation of the propagation time caused by a positional relationship with a reflecting object or objects in multi-path propagation paths. Therefore, a cross-correlation coefficient (which represents a delay profile of the propagation path) may be determined within the range of several microseconds to several tens microseconds before and after the present timing. Determination of a cross-correlation coefficient (delay profile) within the range limited in this manner can be realized also by a plurality of correlators which operate simultaneously. Where it can be regarded that the path timing varies continuously in time, also a timing follow-up method in which a DLL is used as disclosed in the aforementioned reference document 1 has been realized.

Various standards for the W-CDMA are recited in the following reference document 2:

Reference document 2: 3rd Generation Partnership Project; Technical Specification Group Radio Access Network; Spreading and modulation (FDD), 3G TS 25.213 version 3.1.0, December 1999

According to the reference document 2, the W-CDMA uses a Gold code of a period of 10 ms as a spread code and a Walsh code of a period of 1 symbol (the code length varies depending upon the symbol rate). In the downlink, different Gold codes are used in different base stations and for different sectors in the same base station. In the uplink from a mobile station to a base station, Gold codes different among different mobile stations are used, and different Walsh codes are allocated to different physical channels in the same mobile stations. In both of the uplink and the downlink, a pilot symbol modulated with a predetermined code sequence is multiplexed (code multiplexed and time multiplexed).

Different from the downlink in a system based on the IS-95 standards, a pilot symbol of the W-CDMA is not spread with the same spread code (including shifted spread codes) among all base stations or all mobile stations. However, if the spread code is known, then a code sequence of the pilot symbol can be considered as a completely known code sequence. Accordingly, in the W-CDMA, a path timing can be detected by using the pilot symbol to detect a peak of a cross-correlation between a predetermined code sequence of the pilot symbol and a received signal. As a conventional path timing detection method for the W-CDMA, a "Reception Timing Detection Circuit for a CDMA Receiver" disclosed in Japanese Patent Laid-Open No. 32523/1998, for example, is known.

In the W-CDMA, however, since the chip rate is higher than that of a system based on the IS-95 standards, a variation of the multi-path paths frequently varies the path timing discontinuously for more than one chip interval (because one chip is 60 ns, it corresponds to a propagation path difference of approximately 78 m). Accordingly, sufficient path tracking cannot be achieved by means of a DLL or a like scheme that is conventionally used for synchronization tracking (tracking) in a system based on the IS-95 standards or a like system.

Meanwhile, a path search circuit which uses the conventional path timing detection method has a problem in that, where the spread ratio of a pilot symbol is high and the code length of the pilot symbol is great, if a cross-correlation coefficient is calculated in the time domain, then a very great amount of calculation is required. Furthermore, a base station must detects path timings of received signals from a plurality of mobile stations, and the prior art has another problem in that a number of identical circuits equal to the number of mobile stations must be prepared and a great amount of calculation is required.

SUMMARY OF THE INVENTION

It is an object of the present invention to provide a path search circuit which can reduce the amount of arithmetic operation required for path search and path tracking in a mobile communications system (cellular system) that uses a DS-CDMA communication method.

It is another object of the present invention to provide a path search circuit which, when applied to a base station apparatus of a cellular system which uses a DS-CDMA communication method, can reduce the amount of arithmetic operation required for path search and path tracking of received signals from a plurality of mobile stations.

According to the present invention, a path search circuit for a receiver which uses a DS-CDMA communication method is for detecting a path timing, which is a timing at which spreading is performed on the transmission side, from a received radio signal and comprises a radio receiving unit, an A/D converter, a cross-correlation coefficient calculating unit, a cross-correlation coefficient averaging unit, and a peak detecting unit.

The radio receiving unit filters and frequency converts the received radio signal to convert the received radio signal into a baseband signal. The A/D converter samples the baseband signal at a sampling rate equal to N times a chip rate to convert the baseband signal into a digital signal.

The cross-correlation coefficient calculating unit includes interleave means, N fast Fourier transform means, reference signal storage means, N cross power spectrum calculating means, N inverse fast Fourier transform means, and deinterleave means.

The interleave means rearranges the baseband signal digitized by the A/D converter into N sequences sampled at chip intervals. The N fast Fourier transform means pick out the N received signal sequences rearranged by the interleave means with mutually overlapped FFT windows of a predetermined time length and performs fast Fourier transform for the picked out received signal sequences. The reference signal storage means stores a signal sequence produced by picking out a predetermined code sequence with FFT windows of a fixed time length and fast Fourier transforming the picked out code sequence as a reference signal.

The N cross power spectrum calculation means determine the product of the received signal fast Fourier transformed by the fast Fourier transform means and a complex conjugate number of the reference signal stored in the reference signal storage means for each of the FFT windows to determine cross power spectra between the received signal and the predetermined code sequence.

The N cross power spectrum averaging means averages the cross power spectra for the respective FFT windows. The N inverse fast Fourier transform means inverse fast Fourier transform the N cross power spectra averaged by the cross power spectrum averaging means to convert the cross power spectra into N cross-correlation coefficients and output the N cross-correlation coefficients.

The deinterleave means rearranges the N cross-correlation coefficients output from the respective inverse fast Fourier transform means in order of time to produce and output a single cross-correlation coefficient.

The cross-correlation coefficient averaging unit averages the cross-correlation coefficient output from the cross-correlation calculating unit over a fixed period of time. The peak detecting unit detects one or a plurality of peaks from the cross-correlation coefficient averaged by the cross-correlation coefficient averaging unit and outputs a timing at which the peak or each of the peaks is obtained as a path timing.

According to an embodiment of the present invention, in the path search circuit for a receiver which uses a DS-CDMA communication method, the value N may be an integer lowest among values which satisfy the relationship: N≧radio bandwidth/chip rate.

According to another embodiment of the present invention, the path search circuit may further comprise interpolation means for oversampling the N cross-correlation functions output from the deinterleave means as sequences of a time interval equal to 1/N the chip interval to M times, where M is a positive integer, and passing the oversampled cross-correlation coefficients through a low-pass filter to produce cross-correlation coefficients oversampled to N×M times the chip rate and then outputting the produced cross-correlation coefficients.

According to another aspect of the present invention, a path search circuit for a receiver which uses a DS-CDMA communication method comprises a radio receiving unit, an A/D converter, a cross-correlation coefficient calculating unit, a cross-correlation coefficient averaging unit, and a peak detecting unit.

The radio receiving unit filters and frequency converts the received radio signal to convert the received radio signal into a baseband signal. The A/D converter samples the baseband signal at a sampling rate equal to N times a chip rate to convert the baseband signal into a digital signal.

The cross-correlation coefficient calculating unit includes interleave means, N fast Fourier transform means, reference signal storage means, N cross power spectrum calculation means, N cross power spectrum averaging means, N first cross power spectrum conversion means, cross power spectrum addition means, second cross power spectrum conversion means, and inverse fast Fourier transform means.

The interleave means rearranges the baseband signal digitized by the A/D converter into N sequences sampled at chip intervals. The N fast Fourier transform means pick out the N received signal sequences rearranged by the interleave means with mutually overlapped FFT windows of a predetermined time length and perform fast Fourier transform for the picked out received signal sequences. The reference signal storage means stores a signal sequence produced by picking out a predetermined code sequence with FFT windows of a fixed time length and fast Fourier transforming the picked out code sequence as a reference signal.

The N cross power spectrum calculation means determine the product of the received signal fast Fourier transformed by the fast Fourier transform means and a complex conjugate number of the reference signal stored in the reference signal storage means for each of the FFT windows to determine cross power spectra between the received signal and the predetermined code sequence. The N cross power spectrum averaging means average the cross power spectra for the respective FFT windows. The N first cross power spectrum conversion means apply reflection by N times and phase rotation in the frequency domain to the N cross power spectra averaged by the cross power spectrum averaging means and having a bandwidth equal to the chip rate to convert the N cross power spectra into a single cross power spectrum having a bandwidth equal to N times the chip rate.

The cross power spectrum addition means adds the N cross power spectra converted by each of the first cross power spectrum conversion means. The second cross power spectrum conversion means adds the number of "0"s equal to N×(M−1) times the chip rate to a high frequency of the cross power spectrum obtained by the addition means, where M is a positive integer. The inverse fast Fourier transform means inverse fast Fourier transforms the cross power spectrum obtained by the second power spectrum conversion means and having a bandwidth increased to M times to determine a cross-correlation coefficient.

The cross-correlation coefficient averaging unit averages the cross-correlation coefficients output from the cross-correlation calculating unit over a fixed period of time. The peak detecting unit detects one or a plurality of peaks from the cross-correlation coefficient averaged by the cross-correlation coefficient averaging unit and outputs a timing at which the peak or each of the peaks is obtained as a path timing.

According to the present invention, an advantage can be anticipated that arithmetic operation processing of cross-correlation coefficients essentially required for path search can be reduced by dividing a received signal into a plurality of FFT windows to perform fast Fourier transform and performing multiplication by a reference signal and averaging in the frequency domain. Particularly since the number of chips per FFT window can be increased by dividing a received signal into a plurality of sequences at one-chip intervals to perform fast Fourier transform, the overlap between FFT windows can be reduced. Since this decreases the number of FFT windows per received signal for a fixed time length, an advantage can be anticipated that the amount of arithmetic operation can be reduced.

If it is desired to raise the accuracy of a path timing higher than a sampling period of the A/D converter, A/D conversion is performed at the possible lowest sampling rate and cross-correlation coefficients or cross power spectra are determined, and then interpolation is performed in the time domain with a required time accuracy. This makes it possible to suppress the amount of arithmetic operation in fast Fourier transform operation, which involves a very great amount of arithmetic operation, to the possible lowest amount.

According to a further aspect of the present invention, a path search circuit for a receiver which uses a DS-CDMA communication method comprises a radio receiving unit, an A/D converter, a cross-correlation coefficient calculating unit, a cross-correlation coefficient averaging unit, and a peak detecting unit.

The radio receiving unit filters and frequency converts the received radio signal to convert the received radio signal into a baseband signal. The A/D converter samples the baseband signal at a sampling rate equal to N times a chip rate to convert the baseband signal into a digital signal.

The cross-correlation coefficient calculating unit includes interleave means, N fast Fourier transform means, reference signal storage means, cross power spectrum calculation means, cross power spectrum averaging means, inverse fast Fourier transform means, and deinterleave means.

The interleave means rearranges the baseband signal digitized by the A/D converter into N sequences sampled at chip intervals. The N fast Fourier transform means pick out the N received signal sequences rearranged by the interleave means with mutually overlapped FFT windows of a predetermined time length and perform fast Fourier transform for the picked out received signal sequences. The reference signal storage means is provided for each channel and stores a signal sequence produced by picking out a predetermined code sequence with FFT windows of a fixed time length and fast Fourier transforming the picked out code sequence as a reference signal. The N cross power spectrum calculation means are provided for each channel and determine the product of the received signal fast Fourier transformed by the fast Fourier transform means and a complex conjugate number of the reference signal stored in the reference signal storage means for each of the FFT windows to determine cross power spectra between the received signal and the predetermined code sequence. The N cross power spectrum averaging means are provided for each channel and average the cross power spectra for the respective FFT windows.

The N inverse fast Fourier transform means are provided for each channel, and inverse fast Fourier transform the N cross power spectra averaged by the cross power spectrum averaging means to convert the cross power spectra into N cross-correlation coefficients and output the N cross-correlation coefficients.

The deinterleave means is provided for each channel, and rearranges the N cross-correlation coefficients output from the respective inverse fast Fourier transform means in order of time to produce and output a single cross-correlation coefficient.

The cross-correlation coefficient averaging unit averages the cross-correlation coefficients output from the cross-correlation calculating unit over a fixed period of time. The peak detecting unit detects one or a plurality of peaks for each channel from the cross-correlation coefficient averaged by the cross-correlation coefficient averaging unit and outputs a timing at which the peak or each of the peaks is obtained as a path timing.

The present aspect of the invention corresponds to a path search circuit which is applied to a base station apparatus which must detect path timings of a plurality of channels (received signals from a plurality of mobile stations) simultaneously. According to the present aspect of the invention, it is required to perform fast Fourier transform operation for a received signal which requires the greatest amount of arithmetic operation only once irrespective of the number of reception channels.

Therefore, the amount of arithmetic operation required per channel can be reduced significantly.

The above and other objects, features and advantages of the present invention will become apparent from the following description with reference to the accompanying drawings which illustrate examples of the present invention.

DETAILED DESCRIPTION OF THE PREFERRED EMBODIMENTS

First Embodiment

Figure 1:
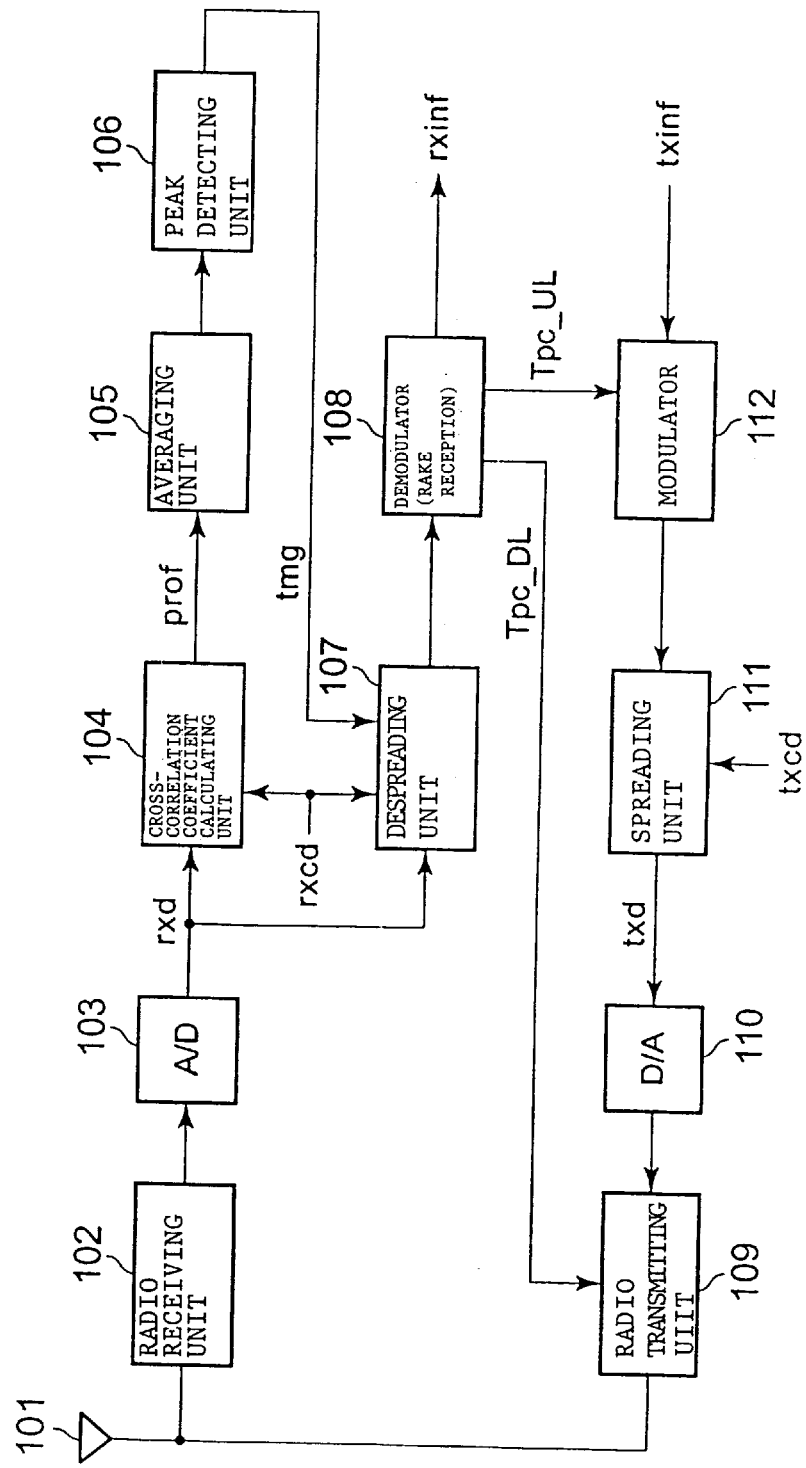
FIG. 1 is a block diagram showing a configuration of a transmitter-receiver which uses a path search circuit of a first embodiment of the present invention.

A transmitter-receiver which uses a path search circuit of a first embodiment of the present invention is a transmitter-receiver which uses a direct sequence code division multiple access (DS-CDMA) communication method, and includes antenna 101, and a receiver and a transmitter. The receiver includes radio receiving unit 102, A/D converter 103, cross-correlation coefficient calculating unit 104, cross-correlation coefficient averaging unit 105, peak detecting unit 106, despreading unit 107 and demodulator 108. The transmitter includes radio transmitting unit 109, D/A converter 110, spreading unit 111, and modulator 112.

The receiver includes a path search circuit that is composed of radio receiving unit 102, A/D converter 103, cross-correlation coefficient calculating unit 104, cross-correlation coefficient averaging unit 105 and peak detecting unit 106.

Radio receiving unit 102 performs filtering and frequency conversion matching with a chip waveform of a transmission signal for a radio signal received by antenna 101 to convert the radio signal into a baseband signal. A/D converter 103 samples the baseband signal produced by radio receiving unit 102 at a sampling rate equal to N times the chip rate to convert the baseband signal into digital received signal rxd. Cross-correlation coefficient calculating unit 104 calculates cross-correlation coefficient prof between received signal rxd digitized by A/D converter 103 and receiving spread code rxcd that is a predetermined code sequence. Cross-correlation coefficient averaging unit 105 averages cross-correlation coefficient prof determined by cross-correlation coefficient calculating unit 104 for a fixed period of time. Peak detecting unit 106 detects one peak or a plurality of peaks from the cross-correlation coefficient averaged by cross-correlation coefficient averaging unit 105 and outputs a timing at which each peak is obtained as path timing tmg.

Despreading unit 107 despreads received signal rxd with receiving spread code rxcd allocated to the pertaining channel at the one or plural path timings determined as above. Demodulator 108 synchronously detects the despread received signal using a pilot signal as a reference signal, for example, to detect reception information rxinf.

As hereinafter described, the sampling frequency of A/D converter 103 may be determined in accordance with a radio bandwidth of transmission-received signals irrespective of the required accuracy for path timing tmg. In particular, the sampling frequency of A/D converter 103 is set to a value that is higher than a Nyquist frequency (=radio bandwidth) so that waveform information may not be lost and that is equal to an integral number of times the chip rate so that later processing may be simplified. Since usually a transmission-reception filter of a roll-off rate lower than 100% is used (radio bandwidth/chip rate≦2), a sampling frequency equal to twice the chip rate should be used for sampling. Therefore, the present embodiment will be described in connection with a case for N=2.

First, operation of the transmitter-receiver shown in FIG. 1 will be described. First, operation of the receiver will be described.

Referring to FIG. 1, in the present transmitter-receiver, a signal received by antenna 101 is filtered with a bandwidth matching with a transmission signal and frequency converted into a baseband signal by radio receiving unit 102, and then converted into a digital baseband signal (rxd, represented by a complex number whose real part indicates an in-phase component and whose imaginary part indicates an orthogonal component) by A/D converter 103. Receive baseband signal rxd is supplied to cross-correlation coefficient calculating unit 104 in which it is used for path search and to despreading unit 107 in which it is used for despreading and demodulation.

The path search is started by cross-correlation coefficient calculating unit 104 which first calculates cross-correlation coefficient prof between received signal rxd and the pilot signal spread with receiving spread code rxcd of the pertaining channel within a range of a predetermined delay time.

In a cellular system, the radius of a cell covered by one base station is prescribed, and therefore, path search should be performed within the range of a propagation delay of radio waves between a base station and a mobile station when the mobile station moves within the cell. Accordingly, the delay range for determination of a cross-correlation coefficient can be determined in accordance with the cell radius in advance.

Cross-correlation coefficient averaging unit 105 performs in-phase averaging of cross-correlation coefficient prof within a time range within which the phase variation of the propagation path is small, but, after a time interval within which the phase variation cannot be ignored, determines power of each correlation coefficient (complex value) and performs power averaging. Since the cross-correlation coefficient averaged in this manner represents a delay profile of the multi-path propagation paths, path timing tmg of the multi-path propagation paths can be detected by peak detecting unit 106 which determines one or a plurality of peaks of the cross-correlation coefficient (power value).

The in-phase averaging can be performed in the time domain by cross-correlation coefficient averaging unit 105 or may be performed in the frequency domain by cross power spectrum averaging unit 205 which is hereinafter described. Where the averaging is performed in the frequency domain, the total amount of arithmetic operation can be reduced because the number of times of inverse fast Fourier transform operation and interpolation processing is comparatively small.

Despreading unit 107 despreads received signal rxd with receiving spread code rxcd allocated to the pertaining channel at the one or plural path timings determined as above.

Demodulator 108 synchronously detects the despread received signal using the pilot signal as a reference signal, for example, to detect reception information rxinf. In the case of the multi-path propagation paths, rake reception in which signals are despread and synchronously detected for each of the multi-paths are synthesized at a maximum ratio is also performed by demodulator 108.

When transmission power control essentially required by the DS-CDMA is performed, demodulator 108 must estimate a signal-to-interference power ratio (SIR) of the received signal, compare the estimated SIR with a target SIR necessary to achieve a predetermined reception quality, and calculate an uplink transmission power control command (Tpe_UL) for adjusting the transmission power of the other party (mobile station). Demodulator 108 further has a function of demodulating a down transmission power control command (Tpc_DL) sent thereto from the other party (mobile station) in order to control the transmission power of the transmitter of the transmitter-receiver.

Although such transmission power control as described above is a technique essentially required for the DS-CDMA, no further description of it is given because it is the prior art that does not directly relate to the path search circuit of the present embodiment.

Next, operation of the transmitter will be described. Transmission information txinf and uplink transmission power control command Tpc_UL are multiplexed and QPSK modulated, for example, by modulator 112 and then spread with transmitting spread code txcd by spreading unit 111. Spread transmission signal txd is converted into an analog signal by D/A converter 110, band limited by a roll-off filter in radio transmitting unit 109, and it is frequency converted into a radio frequency signal and then transmitted from antenna 101. The transmission power when the analog signal is amplified by radio transmitting unit 109 is adjusted in accordance with an instruction of down transmission power control command Tpc_DL.

Also such a transmitter as described above is the prior art that does not directly relate to the path search circuit of the present embodiment, and therefore, no further description thereof is given.

The path search circuit of the present embodiment features the configuration of cross-correlation coefficient calculating unit 104 which calculates cross-correlation coefficient prof from received signal rxd and receiving spread code rxcd, and the components thereof other than cross-correlation coefficient calculating unit 104 can be realized based on the prior art.

Next, the configuration of cross-correlation coefficient calculating unit 104 which is the characteristic part of the path search circuit of the present embodiment will be described with reference to FIG. 2.

Figure 2:
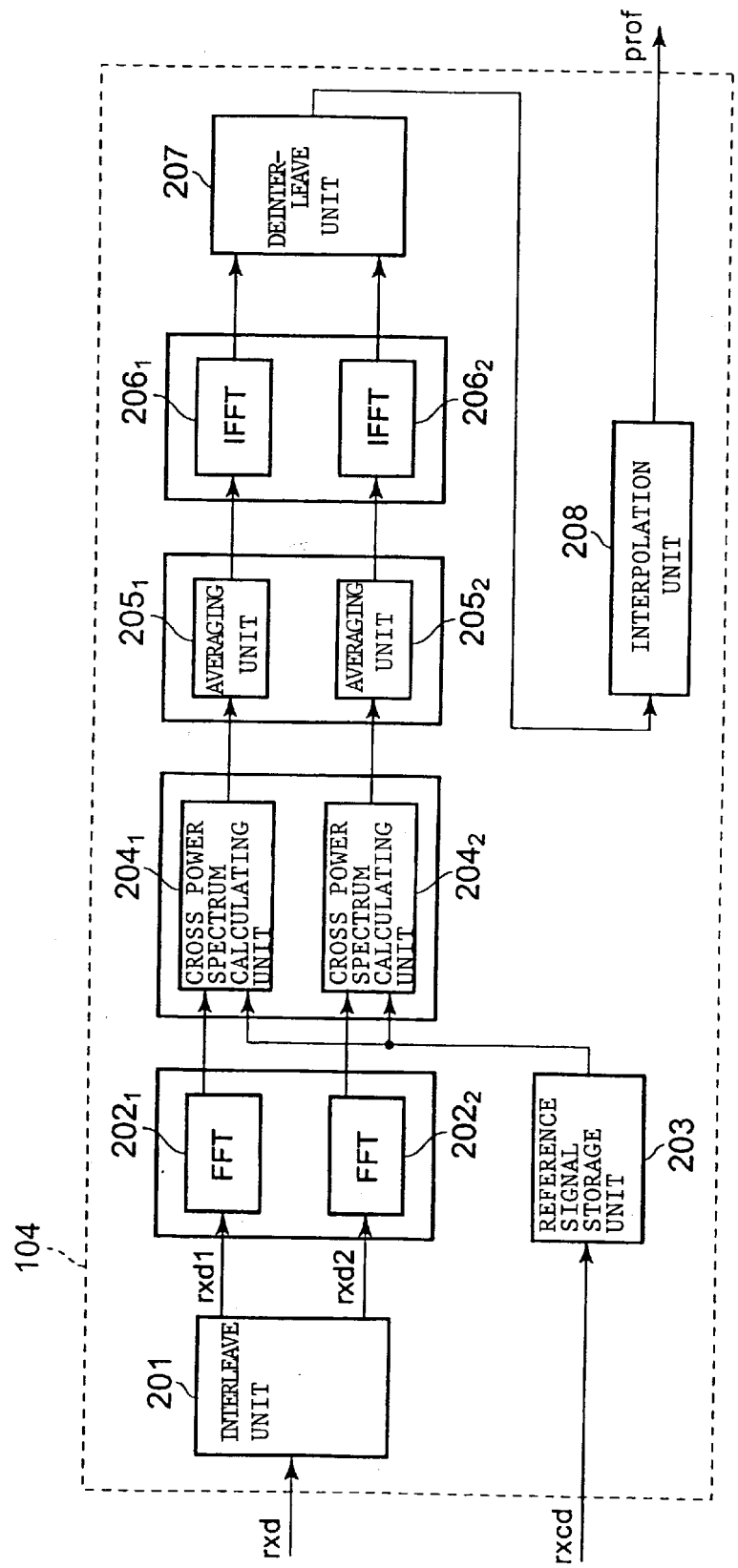
FIG. 2 is a block diagram showing a configuration of cross-correlation coefficient calculating unit 104 shown in FIG. 1.

As shown in FIG. 2, cross-correlation coefficient calculating unit 104 is comprised of interleave unit 201, fast Fourier transform (FFT) units $202_1$, $202_2$, reference signal storage unit 203, cross power spectrum calculating units $204_1$, $204_2$, cross power spectrum averaging units $205_1$, $205_2$, inverse fast Fourier transform (IFTT) units $206_1$, $206_2$, deinterleave unit 207, and interpolation unit 208.

Interleave unit 201 performs a process of rearranging digitized received signal rxd into two series of received signals rxd1, rxd2 sampled at time intervals of one chip which is a unit of the spread code.

Fast Fourier transformers $202_1$, $202_2$ pick out two received signals rxd1, rxd2, which have been re-arranged into sequences of one chip interval by interleave unit 201, with FFT windows of a predetermined time length which overlap with each other and perform fast Fourier transform for picked out received signals rxd1, rxd2.

Reference signal storage unit 203 has a signal sequence stored in advance therein which has been produced by picking out a predetermined code sequence with a FFT window of a predetermined time length and fast Fourier transforming the picked out code sequence. Cross power spectrum calculating units $204_1$, $204_2$ calculate the products of the two received signals fast Fourier transformed by fast Fourier transformers $202_1$, $202_2$ and a complex conjugate of the reference signal stored in reference signal storage unit 203 to thereby calculate cross power spectra between received signal rxd and receiving spread code rxcd which is the predetermined code sequence.

Cross power spectrum averaging units $205_1$, $205_2$ average the cross power spectra calculated by cross power spectrum calculating units $204_1$, $204_2$ for each FFT window, respectively.

Inverse fast Fourier transformers $206_1$, $206_2$ fast Fourier transform the two values of the cross power spectra averaged by cross power spectrum averaging units $205_1$, $205_2$ to convert them into two cross-correlation coefficients of a one-chip interval and output the cross-correlation coefficients.

Deinterleave unit 207 rearranges the two cross-correlation coefficients output from inverse fast Fourier transformers $206_1$, $206_2$ in order of time to produce one cross-correlation coefficient. Interpolation unit 208 interpolates the cross-correlation coefficients rearranged in order of time by deinterleave unit 207 to produce cross-correlation coefficient prof sampled with a required accuracy and outputs cross-correlation coefficient prof.

Next, operation of cross-correlation coefficient calculating unit 104 shown in FIG. 2 will be described in detail with reference to the timing charts of FIGS. 3, 4, 5 and 6.

Figure 3:
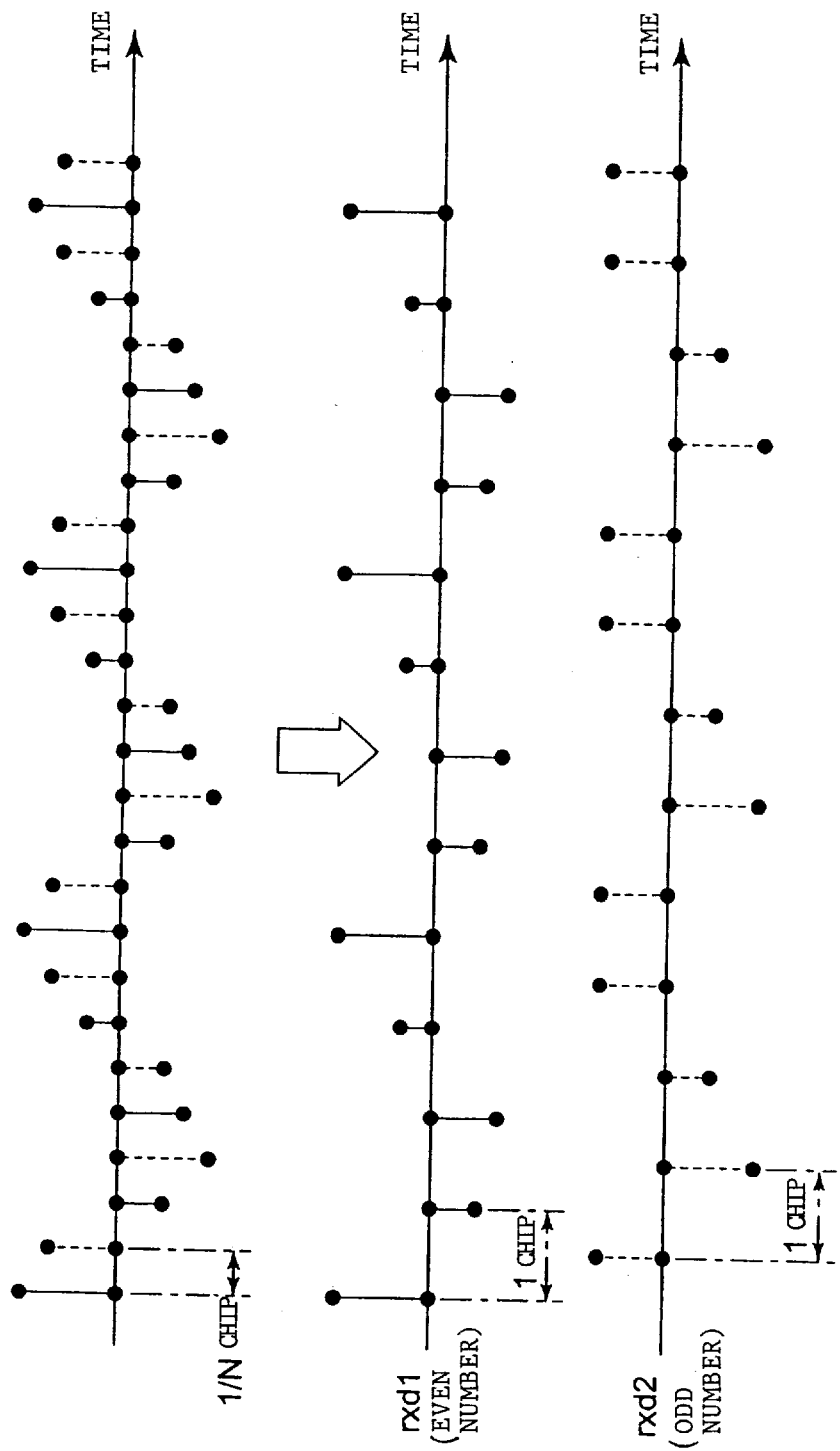
FIG. 3 is timing chart illustrating operation of interleave unit 201 shown in FIG. 2.

FIG. 3 is a timing chart illustrating operation of interleave unit 201 which divides received signal rxd into a plurality of sequences of a one-chip interval. Received signal rxd is represented by a complex number whose real part indicates an in-phase component and whose imaginary part indicates an orthogonal component. However, for the sake of simplicity, received signal rxd is represented only by the real part. When received signal rxd is sampled with a frequency equal to N times the chip rate, interleave unit 201 divides received signal rxd into N sequences of received signals sampled at one-chip intervals. Since the bandwidth/chip rate is usually lower than 2, the present embodiment will be described in connection with a case wherein received signal rxd is sampled with a frequency equal to twice the chip rate. In FIG. 3, received signal rxd is divided into sequence rxd1 composed of even-numbered sample values and sequence rxd2 composed of odd-numbered sample values extracted from received signal rxd.

Figure 4:
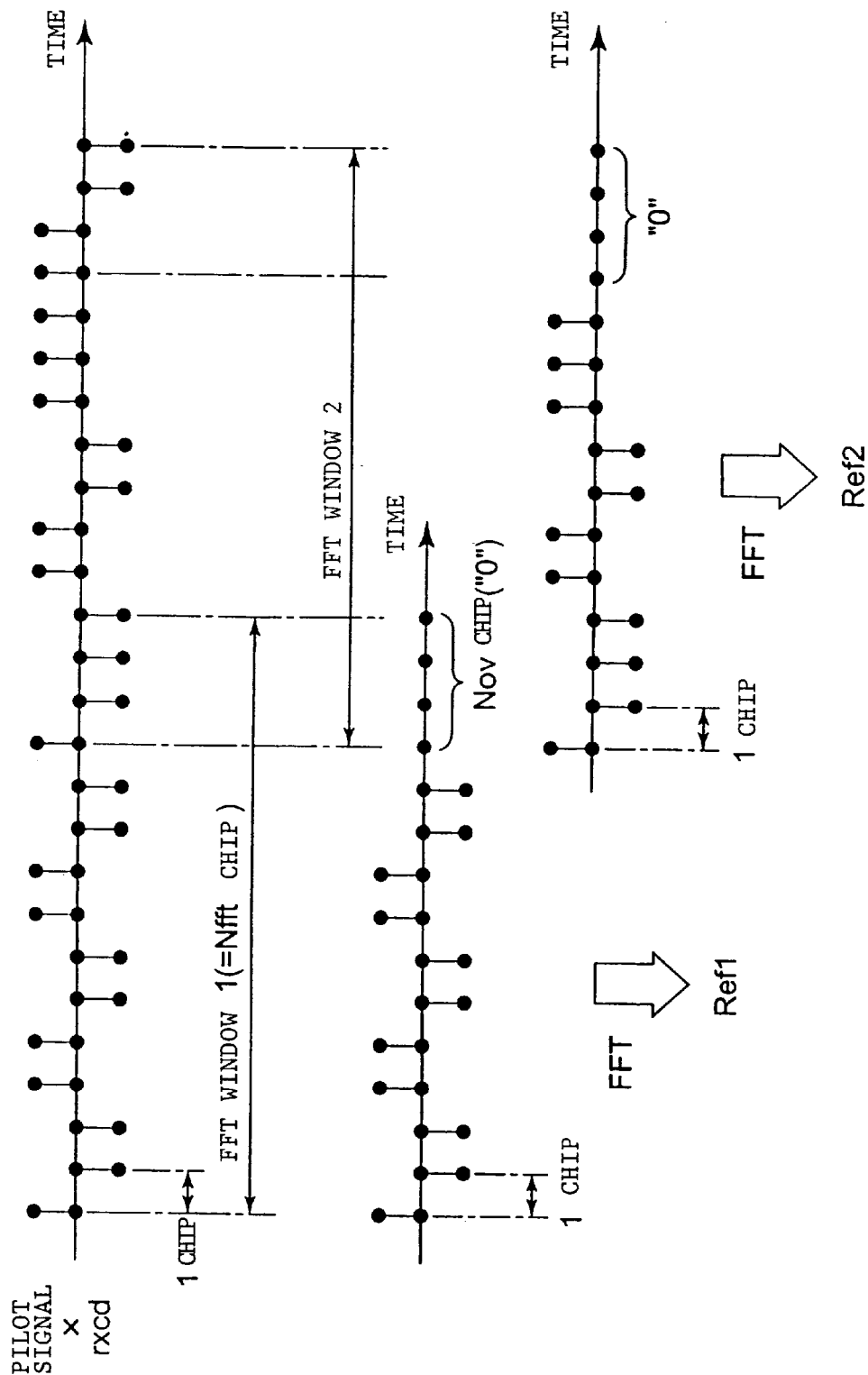
FIG. 4 is a timing chart illustrating a method of producing a reference signal to be stored in advance in reference signal storage unit 203 shown in FIG. 2.

FIG. 4 illustrates a calculation procedure of reference signal Ref to be stored into reference signal storage unit 203. The reference signal may be obtained with fast Fourier transform of a signal obtained by spreading the pilot signal with receiving spread code rxcd, for example. The signal obtained by spreading the pilot signal with receiving spread code rxcd is a signal sequence for each one chip. When the QPSK is used for the modulation and spreading, the signal sequence is a complex signal of four phases with a fixed amplitude ($\pm 1 \pm j$).

As shown in FIG. 4, in order to produce reference signal Ref, the pilot signal is spread with receiving spread code rxcd and is divided into overlapped FFT windows (chip number=Nfft) similarly as in the case of received signal rxd.

However, unlike the case in which received signal rxd is divided, when reference signal Ref is to be divided, "0" of a Nov chip is inserted into the overlapped portion. Since a frequency component of a periodical signal which is repeated in the Nfft chip period is calculated in the fast Fourier transform, a cross-correlation coefficient calculated using a cross power spectrum is calculated as a cross-correlation of cyclically shifted waveforms. Accordingly, an overlapped section in which "0"s are inserted is provided so that the reference signal may not come out of the FFT window even when the reference signal is cyclically shifted within the range of the Nov chips.

A signal obtained by spreading a predetermined signal like the pilot signal with receiving spread code rxcd can be used as reference signal Ref. Therefore, this reference signal Ref is determined in advance and is a signal repeated in a fixed period (1 frame=10 ms period, for example), and consequently, it can be fast Fourier transformed and stored into reference signal storage unit 203 before the reception is started.

Figure 5:
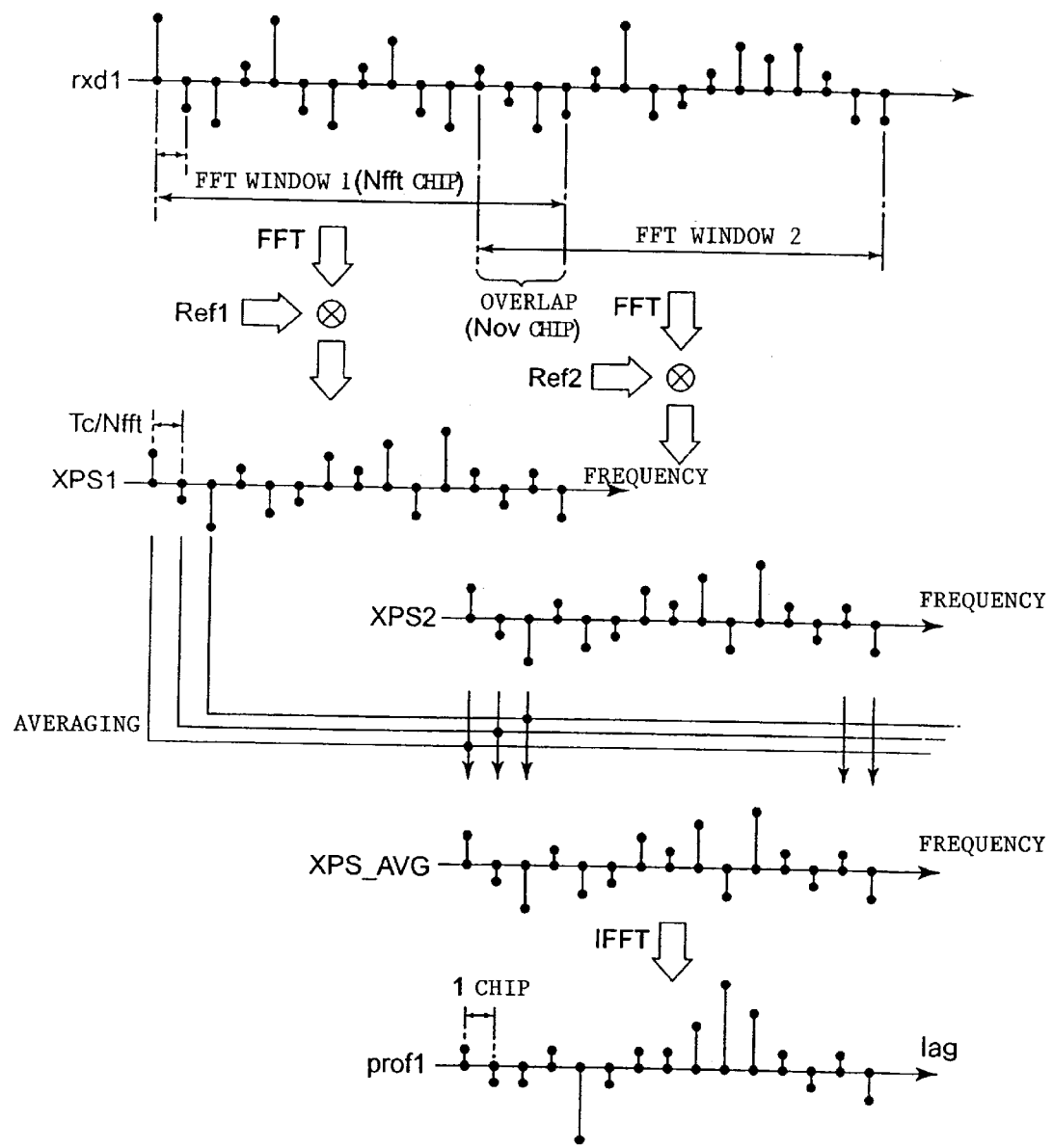
FIG. 5 is a timing chart illustrating operation of fast Fourier transformers $202_1$, $202_2$, cross power spectrum calculating units $204_1$, $204_2$ cross power spectrum averaging units $205_1$, $205_2$, and inverse fast Fourier transformers $206_1$, $206_2$ shown in FIG. 2.

FIG. 5 is a timing chart illustrating operation when received signal rxd1 is divided into overlapped FFT windows and fast Fourier transformed and then multiplied by a complex conjugate value of the reference signal to determine a cross power spectrum and then the cross power spectrum is averaged and fast Fourier transformed to produce cross-correlation coefficient prof of a one-chip interval, whereafter cross-correlation coefficient prof is outputted.

FIG. 5 illustrates a sequence rxd1 for N=2, obtained by extracting only even-numbered samples at one-chip intervals by interleave unit 201. Sequence rxd2 obtained by extraction of only odd-numbered samples is also subject to the quite same processing, and the description thereof is thus omitted.

Even-numbered sample value sequence rxd1 is picked out with overlapped FFT windows (chip number=Nfft). The number (Nov) of overlapped chips is determined from a path search delay range which depends upon the cell radius. If the cell radius <2.5 km and the chip rate=3.84 Mcps, for example, since the propagation delay (both ways) between the base station-mobile station=2.5 km×⅔108 m/s (velocity of radio waves)=16.67 µs, path search may be performed within the range of 16.67 µs×3.84 Mcps=64 chips. In this instance, necessary and sufficient number Nov of overlapped chips is 64. It is to be noted, however, that, in FIGS. 4 and 5, overlapped chip number Nov is shown as being 4 for ease of understanding.

The received signals divided with the FFT windows are subjected to fast-Fourier transform processing and then multiplied by complex conjugate numbers of reference signals Ref1, Ref2, . . . to determine cross power spectra. Since a cross power spectrum (XPS1, XPS2, . . . ) is output for each FFT window, each of the components of the Nfft samples is averaged over all of the FFT windows (synchronous addition in the frequency domain) as shown in FIG. 5.

The cross power spectra (XPS_AVG) thus averaged are subjected to inverse-fast-Fourier transform (IFFT) to determine cross-correlation coefficients prof1 with a one-chip interval. Cross-correlation coefficients are output over the delay range of Nfft chips as a result of the inverse fast Fourier transform. However, those cross-correlation coefficients outside the range of Nov chips necessary for path search are unnecessary and therefore need not be calculated.

Figure 6:
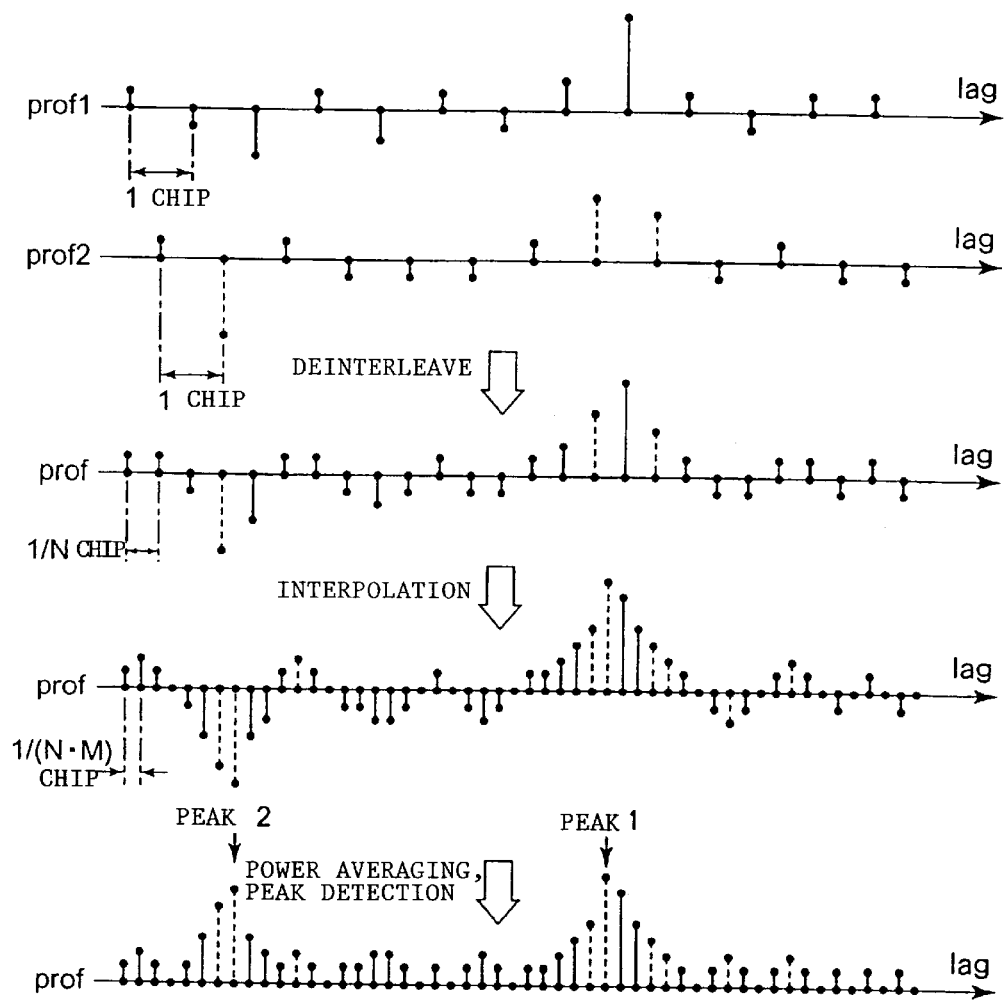
FIG. 6 is a timing chart illustrating operation of deinterleave unit 207 and interpolation unit 208 shown in FIG. 2.

FIG. 6 illustrates operation of cross-correlation coefficient calculating unit 104 in an example of double oversampling (N=2) when cross-correlation coefficients prof1 calculated from even-numbered sample value sequence rxd1 and cross-correlation coefficients prof2 calculated from odd-numbered sample value sequence rxd2 are rearranged in order of the delay time by deinterleave unit 207 and then the sampling accuracy is further raised by twice (M=2) by interpolation unit 208 to detect a path timing with an accuracy in time of the totaling ¼ chip (=1/(N×M)).

Referring to FIG. 6, cross-correlation coefficients (prof1) determined from an even-numbered sample value sequence (rxd1) and cross-correlation functions (prof2) determined from an odd-numbered sample value sequence (rxd2) are rearranged alternately into a single cross-correlation sequence (prof) of a 1/N chip interval (N=2) like an original received signal sequence by the deinterleave means (207). As described hereinabove, although cross-correlation coefficients of Nfft chips are outputted as a result of inverse fast Fourier transform, those for other than Nov chips necessary for path search may be abandoned.

Where interpolation is used to raise the accuracy of a path timing, "0" should be inserted between sample values before the interpolation to raise the sampling frequency and then high frequency components should be cut with a low-pass filter (LPF).

The cross-correlation coefficients (complex numbers) determined in this manner are converted into power values by calculation of the sum of the square of the real part and the square of the imaginary part and then averaged with respect to time to determine a delay profile of the propagation path by cross-correlation coefficient averaging unit 105. Peak detecting unit 106 detects one or a plurality of peaks of the delay profile to detect path timing tmg of the multi-path propagation paths.

As described above, a received signal is divided into a plurality of N sequences at one-chip intervals and then necessary processing such as fast Fourier transform is performed for the sequences. Now, it will be described that the method described can decrease the amount of calculation.

As described hereinabove with reference to FIGS. 5 and 4, in order to use fast Fourier transform to calculate cross-correlation coefficients, it is necessary to use FFT windows which overlap with each other over a time which corresponds to a delay range of the cross-correlation coefficients to be determined. This is because, since the fast Fourier transform assumes a periodical waveform as described hereinabove, it is intended to prevent a cyclically shifted waveform from coming out of a FFT window.

Where a double oversampled receive waveform is fast Fourier transformed as it is, in order to assure an overlap for Nov chips, an overlap by Nov×2 samples must be taken, and therefore, the overlap rate is Nov×2/Nfft. On the other hand, if a receive waveform is divided into a plurality of sequences at one-chip intervals as in the present invention, the overlap rate is Nov/Nfft, and the efficiency drop can be reduced to 1/N.

Although the overlap rate can be improved by using greater FFT windows, since the amount of arithmetic operation in fast Fourier transform increases in proportion to Nfft×log(Nfft), an increase in size of the FFT windows increases the amount of arithmetic operation in fast Fourier transform at a rate corresponding to log(Nfft). Further, this gives rise to a problem that the dynamic range of a result of arithmetic operation halfway becomes large and the accuracy in arithmetic operation (bit width required for calculation) must be increased.

Meanwhile, since a signal obtained by fast Fourier transform of a code of a one-chip interval can be used commonly as a reference signal for all sequences of the received signal, the storage capacity necessary to store the reference signal can be reduced approximately to 1/N by division of the received signal into N series.

As a particular example, the storage capacities where the FFT windows=256 and the delay range Nov for determination of a delay profile=64 chips are set for a pilot signal of 1,536 chips (8 symbols×256 chips) are compared.

Where a double oversampled received signal is fast Fourier transformed as it is as in the prior art, since the FFT windows need be overlapped over 64 chips (128 samples) with each other to perform fast Fourier transform, the overlap rate=128/256=50%. In order to perform fast Fourier transform for 1,536 chips, the pilot signal must be divided into 1,536×2/(256−128)=24 FFT windows and arithmetic operation such as fast Fourier transform must be performed with the 24 FFT windows.

On the other hand, where a received signal is divided into two series of even-numbered samples and odd-numbered samples to perform fast Fourier transform as in the present embodiment, if FFT windows are overlapped over 64 chips, then the overlap rate=64/256=25%. Then, the pilot signal is divided into 1,536/(256−64)=8 FFT windows for each of the two series, and therefore, totaling 16 times of arithmetic operation such as fast Fourier transform should be performed.

In this manner, between the method according to the present embodiment wherein a digitized received signal is divided into sequences at one-chip intervals and processing is performed for each of the sequences and the conventional method wherein a digitized received signal is processed as it is, the ratio in amount of arithmetic operation is approximately 24:16. In other words, it can be recognized that use of the method according to the present embodiment can achieve an effect of the reduction of the amount of arithmetic operation by approximately 33%.

In this manner, according to the present embodiment, an advantage can be anticipated that arithmetic operation processing of cross-correlation coefficients essentially required for path search can be reduced by dividing a received signal into a plurality of FFT windows to perform fast Fourier transform and performing multiplication by a reference signal and averaging in the frequency domain.

Particularly since the number of chips per FFT window can be increased by dividing a received signal into a plurality of sequences at one-chip intervals to perform fast Fourier transform, the overlap between FFT windows can be reduced. Since this decreases the number of FFT windows per received signal for a fixed time length, an advantage can be anticipated that the amount of arithmetic operation can be reduced.

If it is desired to raise the accuracy of a path timing higher than that of a sampling period of A/D converter 103, A/D conversion is performed at the possible lowest sampling rate and cross-correlation coefficients or cross power spectra are determined, and then interpolation is performed in the time domain with a required time accuracy. This makes it possible to suppress the amount of arithmetic operation in fast Fourier transform operation, which involves a very great amount of arithmetic operation, to the possible lowest amount.

In the W-CDMA, the roll-off factor of the transmission/reception filters is 0.22, and therefore, A/D converter 103 should perform sampling with a sampling rate equal to twice (N=2) the chip rate. Therefore, in the present embodiment, N by which received signal rxd is divided by interleave unit 201 is 2. Where the path timing detection accuracy is ¼ chip, the characteristic deterioration can be suppressed to 0.25 dB or less. Therefore, cross-correlation coefficients determined by double oversampling, for example, should be increased to twice by interpolation (M=2) to determine a delay file with a ¼ chip accuracy, and then peaks of the delay profile should be detected to detect path timings.

In the double oversampling (N=2), two sequences of an even-numbered sample value sequence and an odd-numbered sample value sequence are output from interleave unit 201. Accordingly, fast Fourier transformers $202_1$, $202_2$, cross power spectrum calculating units $204_1$, $204_2$, cross power spectrum averaging units $205_1$, $205_2$ and inverse fast Fourier transformers $206_1$, $206_2$ must be prepared individually for the two sequences. However, since merely the same processing is repeated twice, the same hardware should be used to perform time division processing. Particularly such processing as described above is performed advantageously by a digital signal processor (DSP), and cross-correlation coefficient calculating unit 104, cross-correlation coefficient averaging unit 105 and peak detecting unit 106 can be implemented as firmware of a DSP.

Second Embodiment

Next, a path search circuit of a second embodiment of the present invention will be described with reference to the drawings.

In order to raise the accuracy of a path timing higher than the sampling period of A/D converter 103, the first embodiment described above uses a method wherein cross-correlation coefficients are interpolated in the time domain to raise the accuracy of path timings.

To this end, cross-correlation coefficient calculating unit 104 shown in FIG. 2 includes interpolation unit 208 which oversamples an output of deinterleave unit 207 with a required accuracy and passes the oversampled output through a low-pass filter (LPF).

The present embodiment uses another method wherein, in order to raise the accuracy of path timings higher than the sampling period of A/D converter 103, cross-correlation coefficients are inverse fast Fourier transformed after the bandwidth of a cross power spectrum is increased in the frequency domain.

Figure 7:
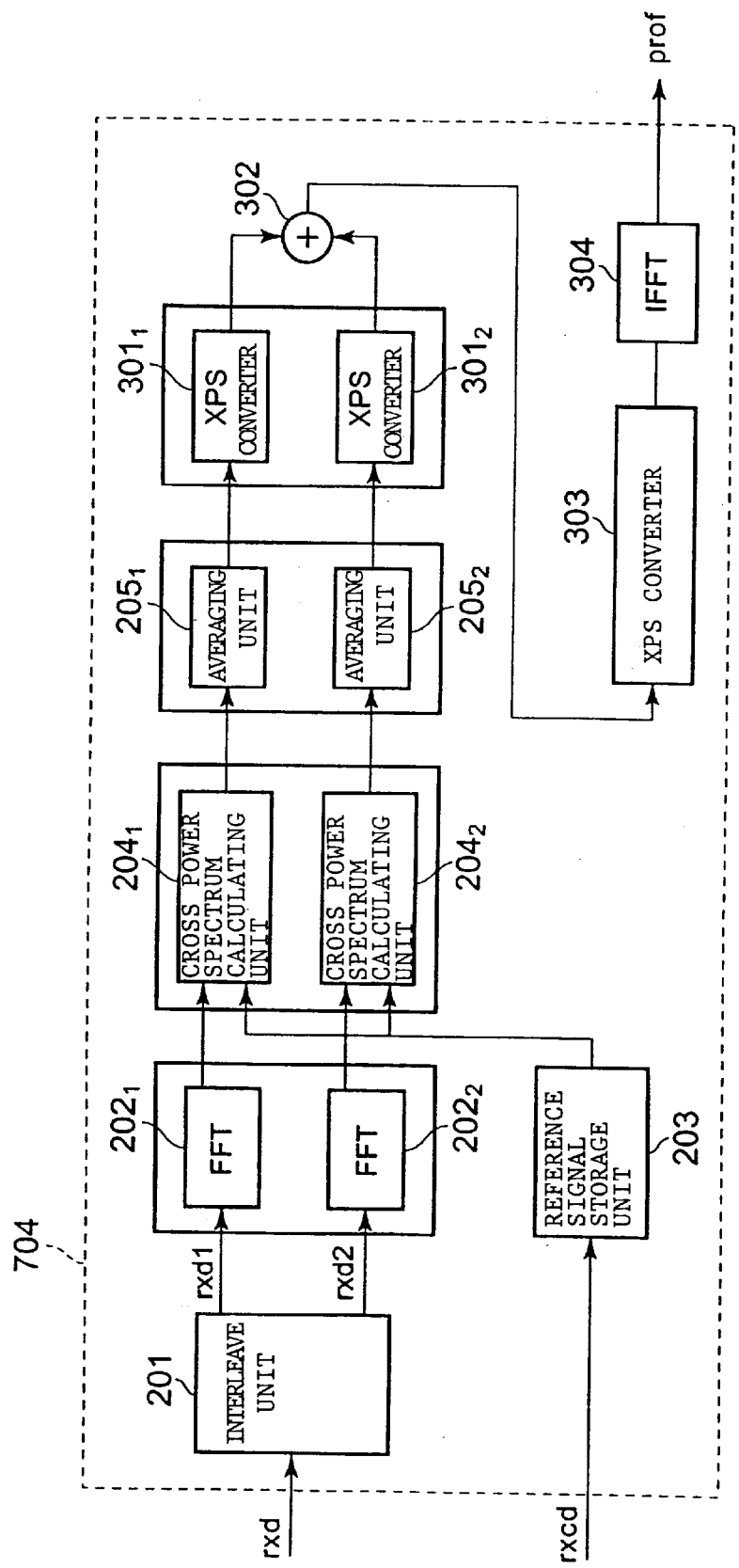
FIG. 7 is a block diagram showing a configuration of cross-correlation coefficient calculating unit 704 of a path search circuit of a second embodiment of the present invention.

A configuration of cross-correlation coefficient calculating unit 704 used in the path search circuit of the present embodiment is shown in FIG. 7. The path search circuit of the present embodiment replaces cross-correlation coefficient calculating unit 104 in the path search circuit of the first embodiment shown in FIG. 1 with cross-correlation coefficient calculating unit 704. When compared with cross-correlation coefficient calculating unit 104 shown in FIG. 2, cross-correlation coefficient calculating unit 704 eliminates inverse fast Fourier transformers $206_1$, $206_2$, deinterleave unit 207, and interpolation unit 208, but additionally includes cross power spectrum converters $301_1$, $301_2$, 303, adder 302, and inverse fast Fourier transformer 304 for a converted cross power spectrum. In FIG. 7, like components to those in FIG. 2 are denoted by like reference characters, and overlapping description of them is omitted herein.

Cross power spectrum converters $301_1$, $301_2$ apply reflection twice and phase rotation in the frequency domain to average values of two cross power spectra obtained by cross power spectrum averaging units $205_1$, $205_2$ and having a bandwidth equal to the chip rate to convert the cross power spectra into a single cross power spectrum having a bandwidth equal to twice the chip rate. Cross power spectrum adder 302 adds the cross power spectra obtained by the conversion of cross power spectrum converters $301_1$, $301_2$.

Cross power spectrum converter 303 adds a number of "0"s equal to N (=2)×(M−1) times the chip rate to a high frequency band of the cross power spectrum obtained by adder 302 to determine a cross power spectrum having a bandwidth equal to N×M times the chip rate. In short, cross power spectrum converter 303 expands the bandwidth to that corresponding to a required accuracy for path timings.

Inverse fast Fourier transform (IFFT) unit 304 inverse fast Fourier transforms the cross power spectrum obtained by cross power spectrum converter 303 and having a bandwidth increased to M times to determine cross-correlation coefficients.

Since a receive sequence oversampled to N times is the sum of N series of a one-chip interval, if a cross power spectrum when each of N sequences is sampled to N times is determined and the sum of the resulting N cross power spectra is calculated, then a cross power spectrum of the receive sequence oversampled to N times can be determined.

A cross power spectrum when each sequence is oversampled to N times can be determined by repeating the cross power spectrum sampled to one time by N times in the frequency domain.

Since the N sequences are sample sequences displaced successively by a time equal to 1/N chip, processing of delaying the time by 1/N may be performed in the frequency domain. If the chip period is represented by Tc, a process of delaying the time by n×TC/N, for n=1, . . . N−1, is equivalent to applying to the cross power spectrum a phase rotation given by $$\exp(-j \times 2\pi k \times n / N \times Nfft).$$

Where, k=0, 1, . . . , N×Nfft−1 is a suffix indicative of a kth sample value of the cross power spectrum.
Particularly for N=2, a phase rotation given by $$\exp(-j \times \pi k / Nfft), k=0, 1, \ldots, 2Nfft-1$$

may be applied to the cross power spectrum of the odd-numbered sample value sequence.

Cross power spectrum converter 303 may pack "0"s into a high frequency region of the cross power spectrum. In particular, in order to raise the time resolution of cross-correlation coefficients to M times, N×Nfft×(M−1) "0"s should be added to N×Nfft samples of the outputs of cross power spectrum converters $301_1$, $301_2$ to obtain N×Nfft×M samples.

Inverse fast Fourier transform may be performed for the cross power spectrum of N×Nfft×M samples, and at this time, cross-correlation coefficient prof oversampled at 1/N×M chip intervals can be obtained.

Similar advantages to those achieved by the path search circuit of the first embodiment can be achieved by the path search circuit of the present embodiment, and therefore, overlapping description is omitted.

Third Embodiment

Next, a path search circuit of a third embodiment of the present invention will be described.

The path search circuit of the present embodiment corresponds to the path search circuit of the first embodiment shown in FIG. 1 which is applied to a base station apparatus which must detect path timings of a plurality of channels (received signals from a plurality of mobile stations) simultaneously.

Figure 8:
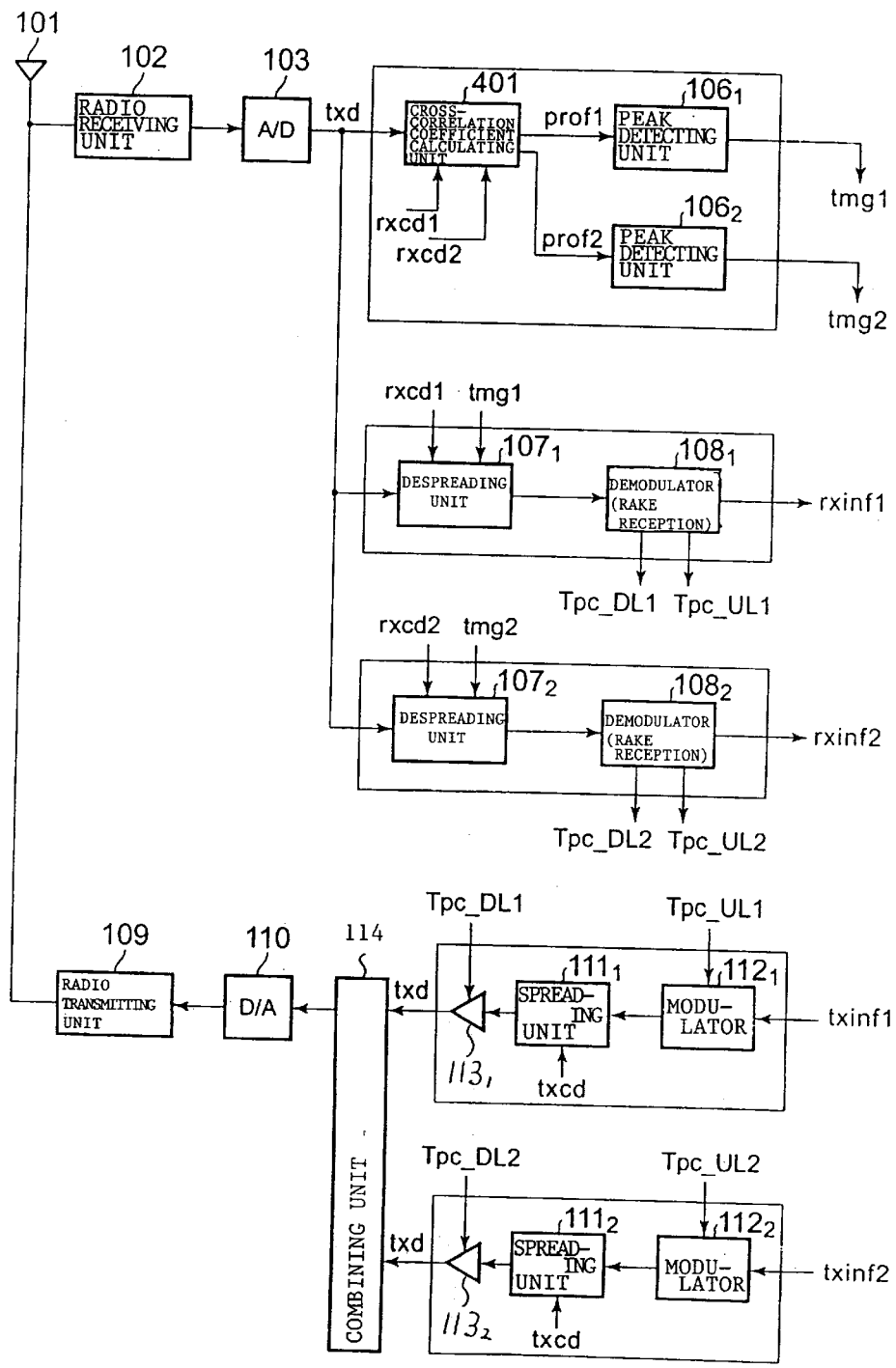
FIG. 8 is a block diagram showing a configuration of a transmitter-receiver which uses a path search circuit of a third embodiment of the present invention.
Figure 9:
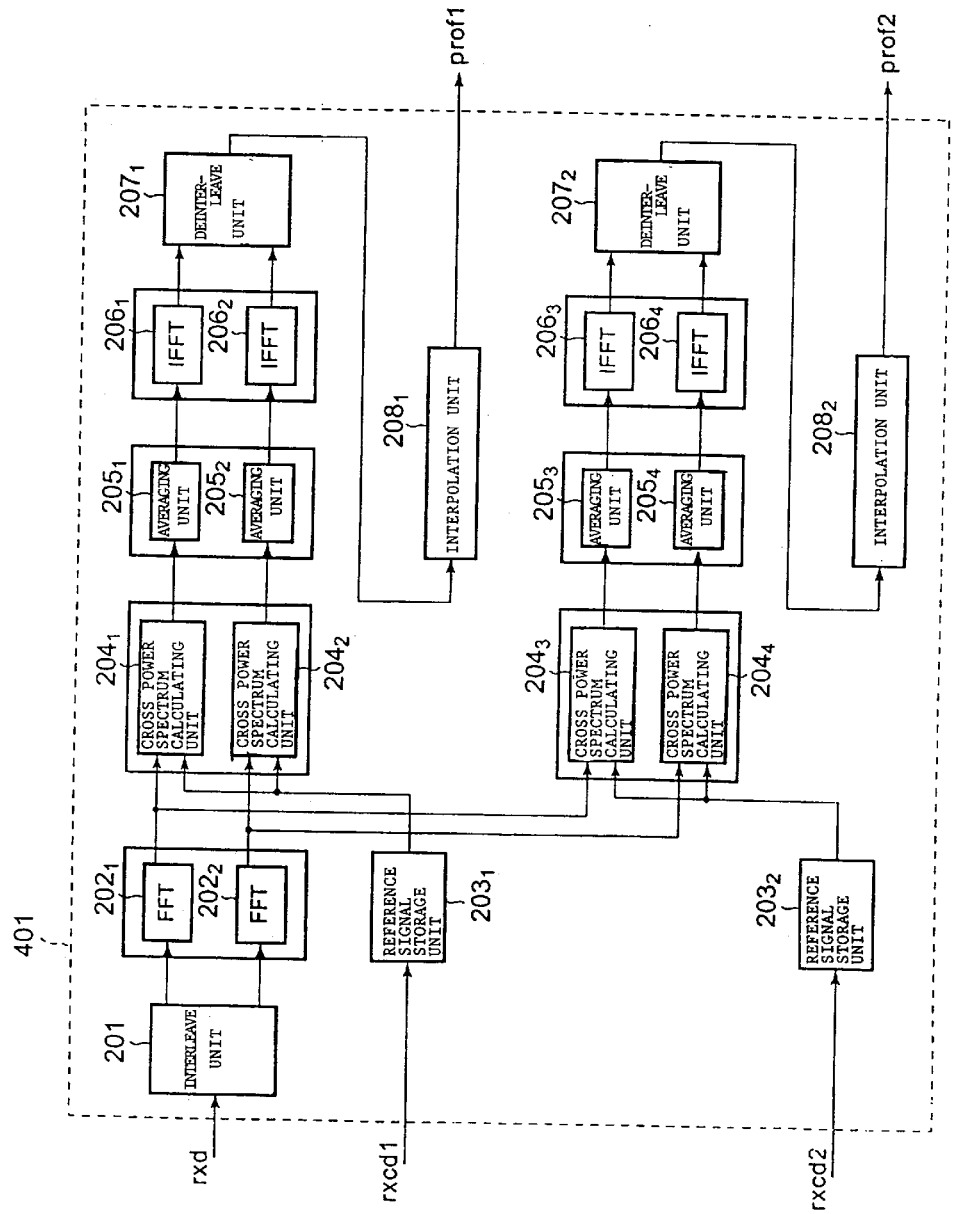
FIG. 9 is a block diagram showing a configuration of cross-correlation coefficient calculating unit 401 shown in FIG. 9.

A transmitter-receiver which uses the path search circuit of the present embodiment is shown in FIG. 8, and cross-correlation coefficient calculating unit 401 shown in FIG. 8 is shown in FIG. 9.

As shown in FIG. 8, the transmitter-receiver which uses the path search circuit of the present embodiment includes antenna 101, radio receiving unit 102, A/D converter 103, cross-correlation coefficient calculating unit 401, peak detecting unit $106_1$, $106_2$, despreading units $107_1$, $107_2$, demodulators $108_1$, $108_2$, modulators $112_1$, $112_2$, spreading units $111_1$, $111_2$, gain controlled amplifiers $113_1$, $113_2$, combining unit 114, radio transmitting unit 109, and D/A converter 110.

Referring to FIG. 8, while the transmitter-receiver includes transmitters and receivers for a plurality of channels, cross-correlation coefficient calculating unit 401 for detecting a path timing of each channel are common to all of the channels.

As shown in FIG. 9, cross-correlation coefficient calculating unit 401 in the present embodiment includes interleave unit 201, fast Fourier transform (FFT) units $202_1$, $202_2$, reference signal storage units $203_1$, $203_2$, cross power spectrum calculating units $204_1$ to $204_4$, cross power spectrum averaging units $205_1$ to $205_4$, inverse fast Fourier transformers $206_1$ to $206_4$, deinterleave units $207_1$, $207_2$, and interpolation units $208_1$, $208_2$.

Referring to FIG. 9, cross-correlation coefficient calculating unit 401 includes one interleave unit 201 and two fast Fourier transformers $202_1$, $202_2$ independently of the number of channels. This is because, since the channels in the DS-CDMA are code division multiplexed, a single received signal corresponds to all channels and interleave processing by interleave unit 201 and fast Fourier transform operation by fast Fourier transformers $202_1$, $202_2$ are processes performed independently of spread codes rxcd1, rxcd2 used for distinction of the channels.

While fast Fourier transform operation must be performed repetitively for a plurality of FFT windows, inverse fast Fourier transform may be performed only once after averaging. Processing of cross power spectrum calculating units $204_1$ to $204_4$ and cross power spectrum averaging units $205_1$ to $205_4$ is multiplication or addition to be performed once for one sample, the amount of arithmetic operation for the processing is smaller than that of the fast Fourier transform operation. Accordingly, it is required to perform fast Fourier transform operation for a received signal which requires the greatest amount of arithmetic operation only once irrespective of the number of reception channels, and therefore, the amount of arithmetic operation required per channel can be reduced significantly.

When the base station apparatus receives a plurality of channels simultaneously, the fast Fourier transform means for which the greatest amount of arithmetic operation is required can be used commonly for all channels, and therefore, there is an advantage that the amount of arithmetic operation per channel can be reduced.

While preferred embodiments of the present invention have been described using specific terms, such description is for illustrative purposes only, and it is to be understood that changes and variations may be made without departing from the spirit or scope of the following claims.

What is claimed is:

1. A path search circuit for a receiver which uses a DS-CDMA communication method, for detecting a path timing, which is a timing at which spreading is performed on the transmission side, from a received radio signal, said circuit comprising:

a radio receiving unit for filtering and frequency converting the received radio signal to convert the received radio signal into a baseband signal;

an A/D converter for sampling the baseband signal at a sampling rate equal to N times a chip rate to convert the baseband signal into a digital signal;

a cross-correlation coefficient calculating unit including interleave means for rearranging the baseband signal digitized by said A/D converter into N sequences sampled at chip intervals, N fast Fourier transform means for obtaining the N received signal sequences rearranged by said interleave means with mutually overlapped FFT windows of a predetermined time length and performing fast Fourier transform for the picked out received signal sequences, reference signal storage means for storing a signal sequence produced by picking out a predetermined code sequence with FFT windows of a fixed time length and fast Fourier transforming the picked out code sequence as a reference signal, N cross power spectrum calculation means for determining the product of the received signal fast Fourier transformed by said fast Fourier transform means and a complex conjugate number of the reference signal stored in said reference signal storage means for each of the FFT windows to determine cross power spectra between the received signal and the predetermined code sequence, N cross power spectrum averaging means for averaging the cross power spectra for the respective FFT windows, N inverse fast Fourier transform means for inverse fast Fourier transforming the N cross power spectra averaged by said cross power spectrum averaging means to convert the cross power spectra into N cross-correlation coefficients and outputting the N cross-correlation coefficients, and deinterleave means for rearranging the N cross-correlation coefficients output from said respective inverse fast Fourier transform means in order of time to produce and output a single cross-correlation coefficient;

a cross-correlation coefficient averaging unit for averaging the cross-correlation coefficients output from said cross-correlation calculating unit over a fixed period of time; and a peak detecting unit for detecting one or a plurality of peaks from the cross-correlation coefficient averaged by said cross-correlation coefficient averaging unit and outputting a timing at which the peak or each of the peaks is obtained as a path timing.

2. A path search circuit according to claim 1, wherein the value N is an integer lowest among values which satisfy relationship: N≧radio bandwidth/chip rate.

3. A path search circuit according to claim 2, further comprising interpolation means for oversampling the N cross-correlation functions output from said deinterleave means as sequences of a time interval equal to 1/N the chip interval to M times, where M is a positive integer, and passing the oversampled cross-correlation coefficients through a low-pass filter to produce cross-correlation coefficients oversampled to N×M times the chip rate and then outputting the produced cross-correlation coefficients.

4. A path search circuit for a receiver which uses a DS-CDMA communication method for detecting a path timing, which is a timing at which spreading is performed on the transmission side, from a received radio signal, comprising:

a radio receiving unit for filtering and frequency converting the received radio signal to convert the received radio signal into a baseband signal;

an A/D converter for sampling the baseband signal at a sampling rate equal to N times a chip rate to convert the baseband signal into a digital signal;

a cross-correlation coefficient calculating unit including interleave means for rearranging the baseband signal digitized by said A/D converter into N sequences sampled at chip intervals, N fast Fourier transform means for picking out the N received signal sequences rearranged by said interleave means with mutually overlapped FFT windows of a predetermined time length and performing fast Fourier transform for the picked out received signal sequences, reference signal storage means for storing a signal sequence produced by picking out a predetermined code sequence with FFT windows of a fixed time length and fast Fourier transforming the picked out code sequence as a reference signal, N cross power spectrum calculation means for determining the product of the received signal fast Fourier transformed by said fast Fourier transform means and a complex conjugate number of the reference signal stored in said reference signal storage means for each of the FFT windows to determine cross power spectra between the received signal and the predetermined code sequence, N cross power spectrum averaging means for averaging the cross power spectra for the respective FFT windows, N first cross power spectrum conversion means for applying reflection by N times and phase rotation in the frequency domain to the N cross power spectra averaged by said cross power spectrum averaging means and having a bandwidth equal to the chip rate to convert the N cross power spectra into a single cross power spectrum having a bandwidth equal to N times the chip rate, cross power spectrum addition means for adding the N cross power spectra converted by each of said first cross power spectrum conversion means, second cross power spectrum conversion means for adding a number of "0"s equal to N×(M−1) times the chip rate to a high frequency of the cross power spectrum obtained by said addition means, where M is a positive integer, and inverse fast Fourier transform means for inverse fast Fourier transforming the cross power spectrum obtained by said second power spectrum conversion means and having a bandwidth increased to M times to determine a cross-correlation coefficient;

a cross-correlation coefficient averaging unit for averaging the cross-correlation coefficients output from said cross-correlation calculating unit over a fixed period of time; and a peak detecting unit for detecting one or a plurality of peaks from the cross-correlation coefficient averaged by said cross-correlation coefficient averaging unit and outputting a timing at which the peak or each of the peaks is obtained as a path timing.

5. A path search circuit for a receiver which uses a DS-CDMA communication method for detecting a path timing, which is a timing at which spreading is performed on the transmission side, for each of a plurality of channels from a received radio signal, comprising:

a radio receiving unit for filtering and frequency converting the received radio signal to convert the received radio signal into a baseband signal;

an A/D converter for sampling the baseband signal at a sampling rate equal to N times a chip rate to convert the baseband signal into a digital signal;

a cross-correlation coefficient calculating unit including interleave means for rearranging the baseband signal digitized by said A/D converter into N sequences sampled at chip intervals, N fast Fourier transform means for picking out the N received signal sequences rearranged by said interleave means with mutually overlapped FFT windows of a predetermined time length and performing fast Fourier transform for the picked out received signal sequences, reference signal storage means provided for each channel for storing a signal sequence produced by picking out a predetermined code sequence with FFT windows of a fixed time length and fast Fourier transforming the picked out code sequence as a reference signal, N cross power spectrum calculation means provided for each channel for determining the product of the received signal fast Fourier transformed by said fast Fourier transform means and a complex conjugate number of the reference signal stored in said reference signal storage means for each of the FFT windows to determine cross power spectra between the received signal and the predetermined code sequence, N cross power spectrum averaging means provided for each channel for averaging the cross power spectra for the respective FFT windows, N inverse fast Fourier transform means provided for each channel for inverse fast Fourier transforming the N cross power spectra averaged by said cross power spectrum averaging means to convert the cross power spectra into N cross-correlation coefficients and outputting the N cross-correlation coefficients, and deinterleave means provided for each channel for rearranging the N cross-correlation coefficients output from said respective inverse fast Fourier transform means in order of time to produce and output a single cross-correlation coefficient;

a cross-correlation coefficient averaging unit for averaging the cross-correlation coefficients output from said cross-correlation calculating unit over a fixed period of time; and a peak detecting unit for detecting one or a plurality of peaks for each channel from the cross-correlation coefficient averaged by said cross-correlation coefficient averaging unit and outputting a timing at which the peak or each of the peaks is obtained as a path timing.

6. A path search circuit according to claim 5, wherein the value N is an integer lowest among values which satisfy relationship: $N \geq$ radio bandwidth/chip rate.

7. A path search circuit according to claim 5, further comprising interpolation means for oversampling the N cross-correlation functions output from said deinterleave means as sequences of a time interval equal to 1/N the chip interval to M times, where M is a positive integer, and passing the oversampled cross-correlation coefficients through a low-pass filter to produce cross-correlation coefficients oversampled to N×M times the chip rate and then outputting the produced cross-correlation coefficients.

* * * * *